(12) United States Patent
Usui

(10) Patent No.: US 6,683,864 B1
(45) Date of Patent: Jan. 27, 2004

(54) TRANSMISSION METHOD AND TRANSMISSION APPARATUS

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,979

(22) Filed: Apr. 9, 1999

(30) Foreign Application Priority Data

Apr. 13, 1998 (JP) .......................... P10-101512

(51) Int. Cl.⁷ ........................ H04J 3/16; H04J 11/00
(52) U.S. Cl. ................... 370/346; 370/203; 370/210
(58) Field of Search ............................. 370/346, 480, 370/208, 203, 204, 210, 220, 342, 347, 442, 441, 320, 321, 335; 375/148, 146, 260, 222

(56) References Cited

U.S. PATENT DOCUMENTS

| | | | | | |
|---|---|---|---|---|---|
| 5,416,767 | A | * | 5/1995 | Koppelaar et al. | .......... 370/206 |
| 5,675,572 | A | * | 10/1997 | Hidejima et al. | .......... 370/206 |
| 5,809,030 | A | * | 9/1998 | Mestdagh et al. | .......... 370/480 |
| 5,818,813 | A | * | 10/1998 | Saito et al. | .................. 370/208 |
| 5,959,967 | A | * | 9/1999 | Humphrey et al. | ......... 370/203 |
| 6,175,550 | B1 | * | 1/2001 | van Nee | ..................... 370/206 |
| 6,175,551 | B1 | * | 1/2001 | Awater et al. | ............. 370/210 |
| 6,192,026 | B1 | * | 2/2001 | Pollack et al. | ............. 370/203 |
| 6,603,811 | B1 | * | 8/2003 | Dobson et al. | ............. 375/232 |

* cited by examiner

*Primary Examiner*—Charles Appiah
(74) *Attorney, Agent, or Firm*—Jay H. Maioli

(57) ABSTRACT

A transmission apparatus includes an inverse-Fourier-transforming device for inverse-Fourier-transforming predetermined transmission data at N (N is an arbitrary integer) points, a register (23) for setting N series data transformed by the inverse-Fourier-transforming device, a serial converting device for converting data set by the register (23) into serial data, a transmission processing device for transmitting the data converted by the serial converting device and a control device for controlling the serial converting device based on a judgment of a transmission timing such that the serial converting device starts to convert the data set in the register (23).

6 Claims, 7 Drawing Sheets

TRANSMISSION METHOD AND TRANSMISSION APPARATUS

BACKGROUND OF THE INVENTION

The present invention relates to a transmission method for transmitting an orthogonal frequency division multiplexing (hereinafter simply referred to as an OFDM)-modulated signal and a transmission apparatus to which this transmission method is applied.

Heretofore, when a local area network (LAN) is realized among a plurality of equipment such as a variety of video-equipment, a personal computer apparatus and its peripheral devices within a relatively narrow range such as home and office in order to transmit data handled by these equipment, instead of directly connecting respective equipment via some signal lines, radio signal transmission and reception apparatus (radio transmission apparatus) are connected to the respective equipment so as to transmit data via radio waves.

The local area network is configured by the transmission of radio waves, whereby respective equipment need not be directly connected by signal lines. Thus, the system arrangement can be simplified.

When the local area network is comprised of a plurality of radio transmission apparatus, if signals are simultaneously transmitted from a plurality of transmission apparatus, there is then the possibility that a transmission error will occur. For this reason, a communication among respective transmission apparatus within the network should be access-controlled by some method.

As the access control method, there has heretofore been known a method in which a communication among transmission apparatus (nodes) within the network is unitarily managed by a transmission apparatus (route node) at the central portion of the star-connection in a small-scale radio network. As a general method of avoiding communications from colliding with each other in this case, there is used a band reservation method in which a band is reserved in advance at every transmission line regardless of the existence of transmission data and data is transmitted in the reserved band. However, according to this method, even when there is no data to be transmitted, the band of the transmission line should be maintained and the network resources are used uselessly. There is then the problem that a transmission efficiency is very poor.

As an access method in which the above-mentioned problem could be solved, there is a method in which a communication within the network is effected by controlling polling. According to this method, one arbitrary transmission apparatus within the network is used as a control station (route node) and the route node transmits a control signal for sequential polling to other nodes within the network so that each node transmits data sequentially in response to the polling. When each node receives a polling signal to its own station, if there is data which is to be transmitted from its station, each node transmits a acknowledge signal indicating the acknowledge to its polling, and then transmits data prepared in that station. Thus, it is possible to improve a transmission efficiency by effecting a transmission processing based on this polling.

An arrangement of a radio transmission apparatus for effecting a communication under the above-mentioned polling control and its processing will be described. When an apparatus is of the arrangement such that a transmission and a reception are executed in a time-division manner, a radio transmission apparatus is arranged as shown in FIG. 1. That is, as shown in FIG. 1, an antenna 1 is connected to a movable contact 2m of an antenna change-over switch 2, and one fixed contact 2a of this switch 2 is connected to a reception unit 3, thereby receiving the signal received at the antenna 1. The signal received by the reception unit 3 is supplied to a link layer processing unit 4, in which the received signal is supplied to a processing apparatus side (not shown) and also the link processing based on the received signal is executed. Moreover, a signal transmitted from the link layer processing unit 4 is supplied to a transmission unit 5, and the signal thus processed by this transmission unit 5 is supplied to the other fixed contact 2b of the antenna change-over switch 2. At the timing in which this transmission signal is outputted from the transmission unit 5, the movable contact 2m of the switch 2 is connected to the fixed contact 2b and the transmission signal is transmitted via radio waves.

The transmission processing done by this radio transmission apparatus is executed on the basis of a flowchart shown in FIG. 2, for example. That is, as shown in FIG. 2, following the start of operation, it is determined by the link layer processing unit 4 at the next decision step 201 whether a polling signal to its own station is received. If the polling signal is received by a YES at the decision step 201, then control goes to a step 202, whereat an acknowledge (ACK signal) which acknowledges the polling signal is made. Then, control goes to as step 203, whereat the antenna change-over switch 2 is switched to the transmission side. Then, in a step 204, the acknowledge signal thus made is transmitted (step 204), and the transmission data also is transmitted. At the completion of the transmission processing, the antenna change-over switch 2 is again connected to the reception side at a step 205, and control goes back to the decision step 201.

The transmission processing based on this polling control is executed in the state shown in FIG. 3. As shown in FIG. 3, when a reception packet Ta is received during a predetermined period, the packet received during that period is analyzed (Tb). If it is determined by the analysis of the packet that the polling is intended for its own station, then there exists a period Tc in which transmission data of acknowledge signal is created. After the transmission data is created, there exists a transmission period Td in which the transmission data is used as the transmission signal thus transmitted. That transmission signal is transmitted via radio waves during the period of a transmission packet Te. Accordingly, there occurs a processing delay Tz until the transmission packet Te for acknowledging the reception packet is transmitted.

When the radio transmission is executed, as a system for efficiently transmitting data of a relatively large capacity, there has been developed an orthogonal frequency division multiplex (hereinafter simply referred to as an OFDM)-modulation system. This system is a so-called multicarrier system in which data is dispersed into a plurality of subcarriers and then transmitted.

FIG. 4 is a block diagram showing a transmission processing circuit based on this OFDM-modulation. As shown in FIG. 4, transmission data (this transmission data is supplied from a link layer processing unit 4) supplied to an input terminal 4a are simultaneously set in an input register 5a comprised of a plurality of registers. The data thus set are collectively supplied to an inverse fast Fourier transform circuit (hereinafter simply referred to as an IFFT circuit) 5b, in which an orthogonal transform processing is executed to transform a time axis into a frequency axis by a computation processing based on the inverse fast Fourier transform. The orthogonal transform processing of every one unit based on the inverse fast Fourier transform is executed by an inverse Fourier transform starting signal supplied from the link layer processing unit 4 through a terminal 4b.

Then, the parallel data thus orthogonal-transformed is supplied to an output register 5c connected to the IFFT circuit 5. At the stage in which the setting of the parallel data in the output register 5c is ended, the data thus set is supplied to a parallel-to-serial (hereinafter referred to as a P/S) converter 5d and thereby converted into serial data. The conversion processing of every one unit in the P/S converter 5d is started by an output start signal supplied from the IFFT circuit 5. Then, the serial data thus converted by the P/S converter 5d is supplied to a digital-to-analog (D/A) converter 5e. The signal thus converted by the D/A converter 5e is supplied to a predetermined modulation circuit 5f and thereby modulated. The modulated transmission signal is supplied to a radio-frequency (RF)-system circuit 5g, in which it is converted into a signal having a predetermined transmission frequency, and then transmitted from the antenna 1 connected thereto by radio waves.

The modulation processing of the OFDM-modulated signal thus transmitted takes a lot of time. Specifically, after data are set in the input register connected to the inverse fast Fourier transform circuit, the data are collectively inputted to the inverse fast Fourier transform circuit, in which it is inverse-fast-Fourier-transformed. The data thus inverse-fast-Fourier-transformed is supplied from the output register to the P/S converter and then sequentially outputted as serial data. Accordingly, the processing in which data disposed on the time axis is transformed into data disposed on the frequency axis takes plenty of time. Although not shown in FIG. 4, when the interleave processing for changing the arrangement of transmission data is required, there is then the problem that a time required by the transmission processing is further extended by such interleave processing. Incidentally, in the arrangement of the transmission system shown in FIG. 4, a time (delay time) necessary for the transmission processing at the A/D converter 5e, the modulation circuit 5f and the radio-frequency-system circuit 5g is very short and most of the delay in the transmission processing system is caused by the inverse fast Fourier transform processing.

When this transmission processing is the transmission processing based on the polling control shown in FIG. 3, for example, the transmission processing based on this inverse fast Fourier transform corresponds to the transmission processing period Td. There is then the problem that the processing delay Tz is extended much more. When the communication access control is based on the polling control, during a period in which the polling signal is transmitted from the control station and the acknowledge signal is transmitted from the station which acknowledges the polling signal, other station cannot transmit any signal. Therefore, considering that a prepared transmission channel is used efficiently, it is preferable that the processing delay should be made as short as possible. However, when the above-mentioned OFDM-modulation system is applied, such processing delay time cannot be reduced too much.

SUMMARY OF THE INVENTION

Accordingly, it is an object of the present invention to provide a transmission method and a transmission apparatus in which a transmission processing of an OFDM-modulated signal can be carried out during a short processing time.

According ton an aspect of the present invention, there is provided a transmission method which is comprised of inverse-Fourier-transforming transmission data at N (N is an arbitrary integer) points and accumulating the inverse-Fourier-transformed data as N series data and converting the accumulated N series data into serial data and transmitting the converted serial data by a predetermined transmission processing at a transmission timing.

According to another aspect of the present invention, there is provided a transmission apparatus which is comprised of inverse-Fourier-transforming means for inverse-Fourier-transforming predetermined transmission data at N (N is an arbitrary integer) points, a register for setting N series data transformed by the inverse-Fourier-transforming means, serial converting means for converting data set in the register into serial data, transmission processing means for transmitting the data converted by the serial converting means and control means for controlling on the basis of a judgment of a transmission timing the serial converting means so that the serial converting means starts converting the data set in the register at a proper timing.

According to the present invention, at a transmission timing, previously-prepared and accumulated data can be immediately converted into serial data and then transmitted.

DESCRIPTION OF THE PREFERRED EMBODIMENTS

In this embodiment, the present invention is applied to a radio transmission apparatus for transmitting and receiving an OFDM-modulated signal. This radio transmission apparatus transmits data under polling control from the radio transmission apparatus set as other control station within the network system.

Figure 1:
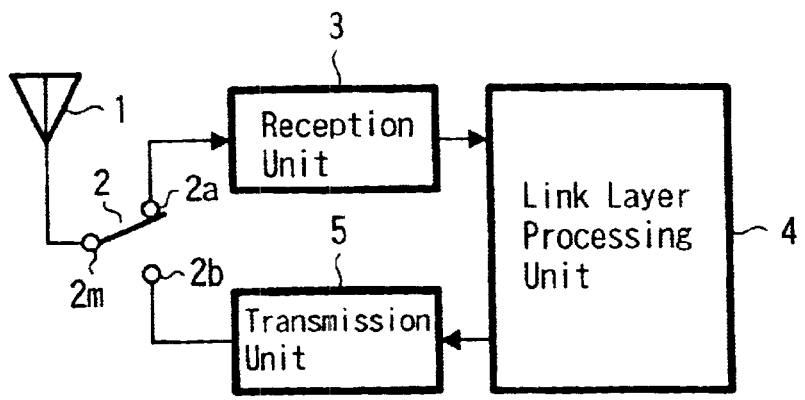
FIG. 1 is a block diagram showing an example of a radio transmission apparatus.
Figure 2:
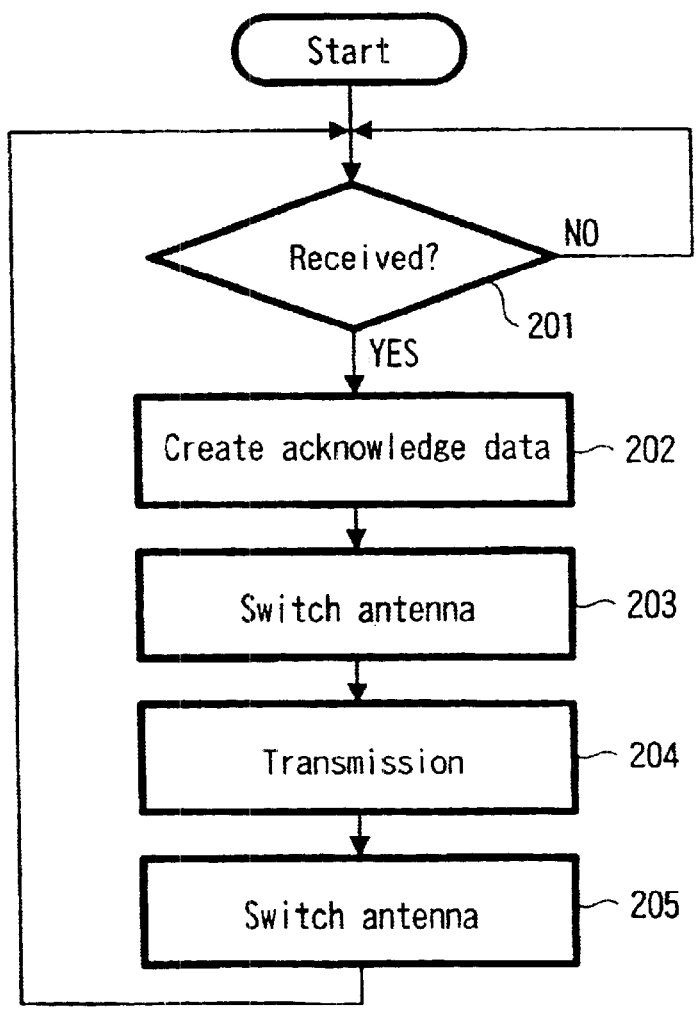
FIG. 2 is a flowchart to which reference will be made in explaining an operation of the radio transmission apparatus shown in FIG. 1.
Figure 3:
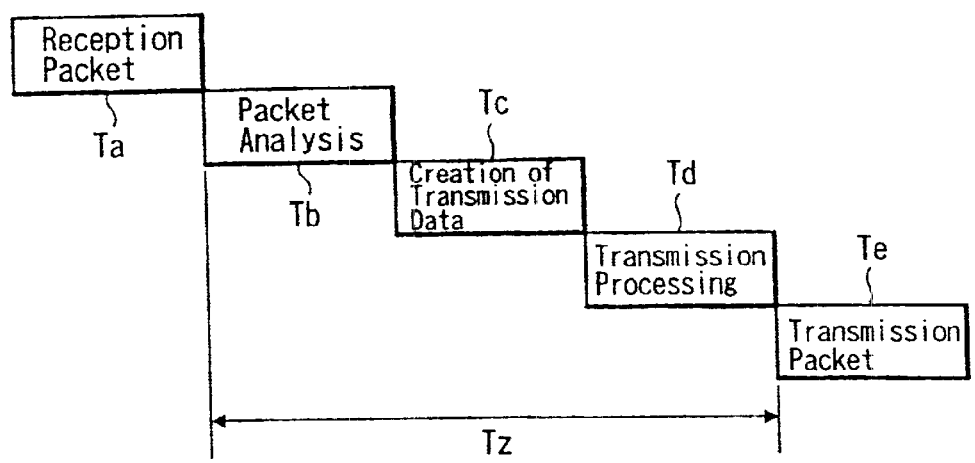
FIG. 3 is a timing chart showing the manner in which a processing is delayed in the radio transmission apparatus shown in FIG. 3.
Figure 4:
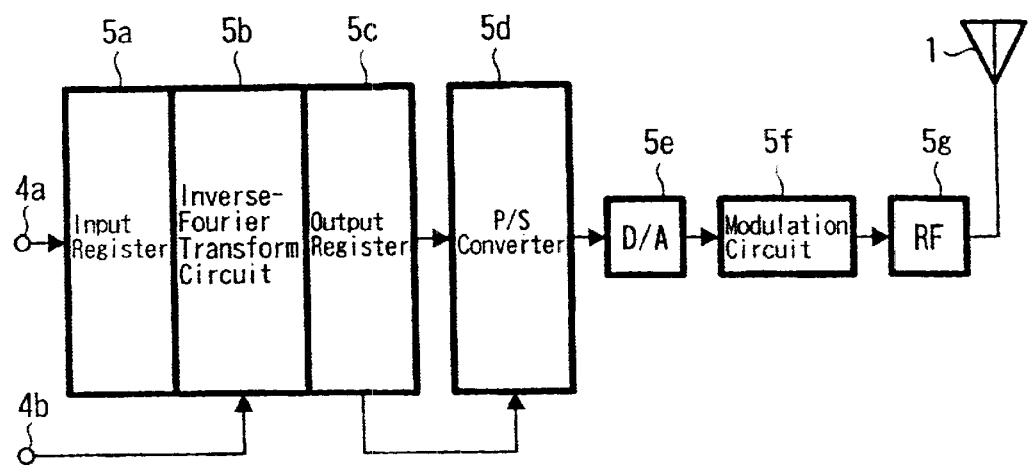
FIG. 4 is a block diagram showing a transmission arrangement for transmitting an OFDM-modulated signal.
Figure 5:
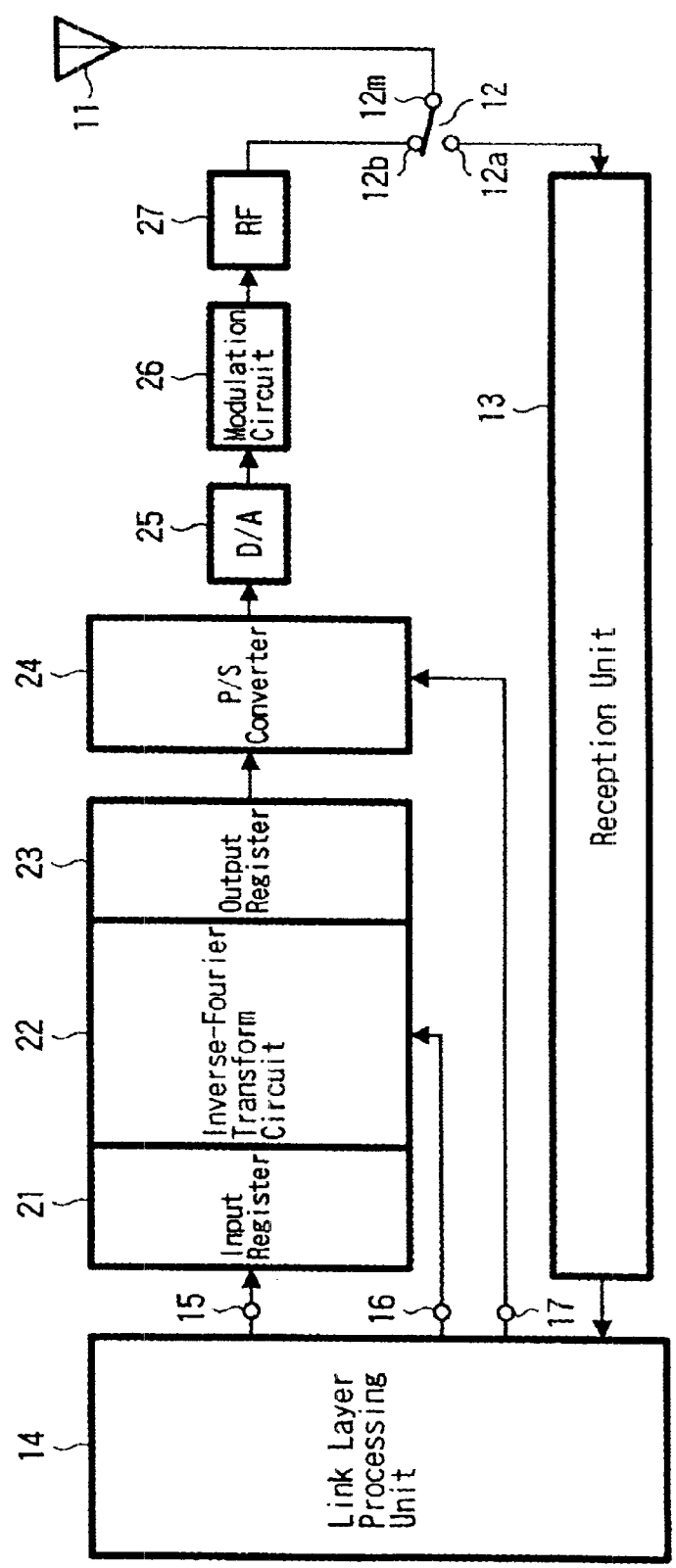
FIG. 5 is a block diagram showing a transmission apparatus according to a first embodiment of the present invention.

FIG. 5 is a block diagram showing an arrangement of a radio transmission apparatus according to this embodiment. As shown in FIG. 5, an antenna 11 is connected to a movable contact 12m of an antenna change-over switch 12, and one fixed contact 12a of this antenna change-over switch 12 is connected to a reception unit 14 serving as a reception-system circuit. The other fixed contact 12b of the antenna change-over switch 12 is connected to an output unit of a radio frequency circuit 27 serving as a transmission-system circuit. The reception and the transmission are carried out in a time-division manner, and the switch 12 is changed-over in unison with the switching of the reception and the transmission.

The reception signal supplied to the reception circuit 13 is converted into an intermediate-frequency signal or a baseband signal, and the orthogonal transform processing for transforming the frequency axis of the transformed signal (OFDM-modulated signal) into the time axis is executed by the Fourier-transform. The data thus Fourier-transformed is supplied to a link layer processing unit 14. The received data is supplied to a processing apparatus side (not shown), and the link processing based on the reception data is executed at the link layer processing unit 14.

The arrangement of the transmission system will be described. Transmission data (or transmission data supplied from a processing apparatus connected to the link layer processing unit 14) generated from the link layer processing unit 14 is supplied from a terminal 15 to an input register 21 connected to an inverse fast Fourier transform circuit (IFFT circuit) 22, and thereby set in this input register 21. The IFFT circuit 22 is the circuit for executing the orthogonal transform processing for transforming the time axis into the frequency axis. Here, if the inverse fast Fourier transform circuit for effecting the transform processing of N points (N is an arbitrary integer: e.g. 64), then the input register 21 comprises registers of N stages connected in parallel. Then, data are simultaneously set in the N-stage registers, and data are simultaneously inputted from the N-stage registers into the IFFT circuit 22. The input of data into this IFFT circuit 22 and the start of the inverse fast Fourier transform processing are instructed by a start signal supplied to the IFFT circuit 22 from the link layer processing circuit 14 through a terminal 16.

Since the transform processing of N points is executed by the IFFT circuit 22, the data thus transformed becomes parallel data of N series, and the parallel data of N series are set in an output register 23. The parallel data of N series set in the output register 23 are simultaneously supplied to a parallel-to-serial (hereinafter simply referred to as a P/S) converter 24, in which they are converted into serial data. With respect to the processing in which the parallel data is converted into the serial data, its start timing is instructed by a conversion start signal supplied from the link layer processing unit 14.

The data thus converted by the P/S converter 24 is supplied to a D/A converter 25. The analog signal thus converted by the D/A converter 25 is supplied to a predetermined modulation circuit 26. The transmission signal thus modulated is converted into a signal having a predetermined transmission frequency by a radio frequency circuit 28, and then transmitted from the antenna 11 connected by the antenna change-over switch 12.

The transmission processing in the transmission-system circuit according to this embodiment will be described. When a polling control signal instructing its own station is received at the reception unit 13, an acknowledge signal which acknowledges the polling is transmitted, and then transmission data supplied from a processing apparatus (not shown) or the like is transmitted. In this embodiment, the acknowledge signal itself is generated under control of the link layer processing unit 14 before the link layer processing unit 14 judges that it should acknowledge the polling. Data of that generated acknowledge signal is set from a terminal 15 to the input register 21 and also the conversion processing start signal is supplied from a terminal 16 to enable the IFFT circuit 22 to execute the inverse fast Fourier transform processing. Data of the result of the inverse-fast-Fourier-transform processing is set and accumulated in the output register 23 and the transmission apparatus is placed in the standby mode. Then, when it is determined by the link layer processing unit 14 that the link layer processing unit 14 should acknowledge the polling, a transmission start signal is supplied from this link layer processing unit 14 through a terminal 17 to the P/S converter 24 which then start the conversion from the parallel data into the serial data.

Then, the transmission processing executed by the radio transmission apparatus according to this embodiment under control of the link layer processing unit 14 will be described with reference to a flowchart of FIG. 6.

Figure 6:
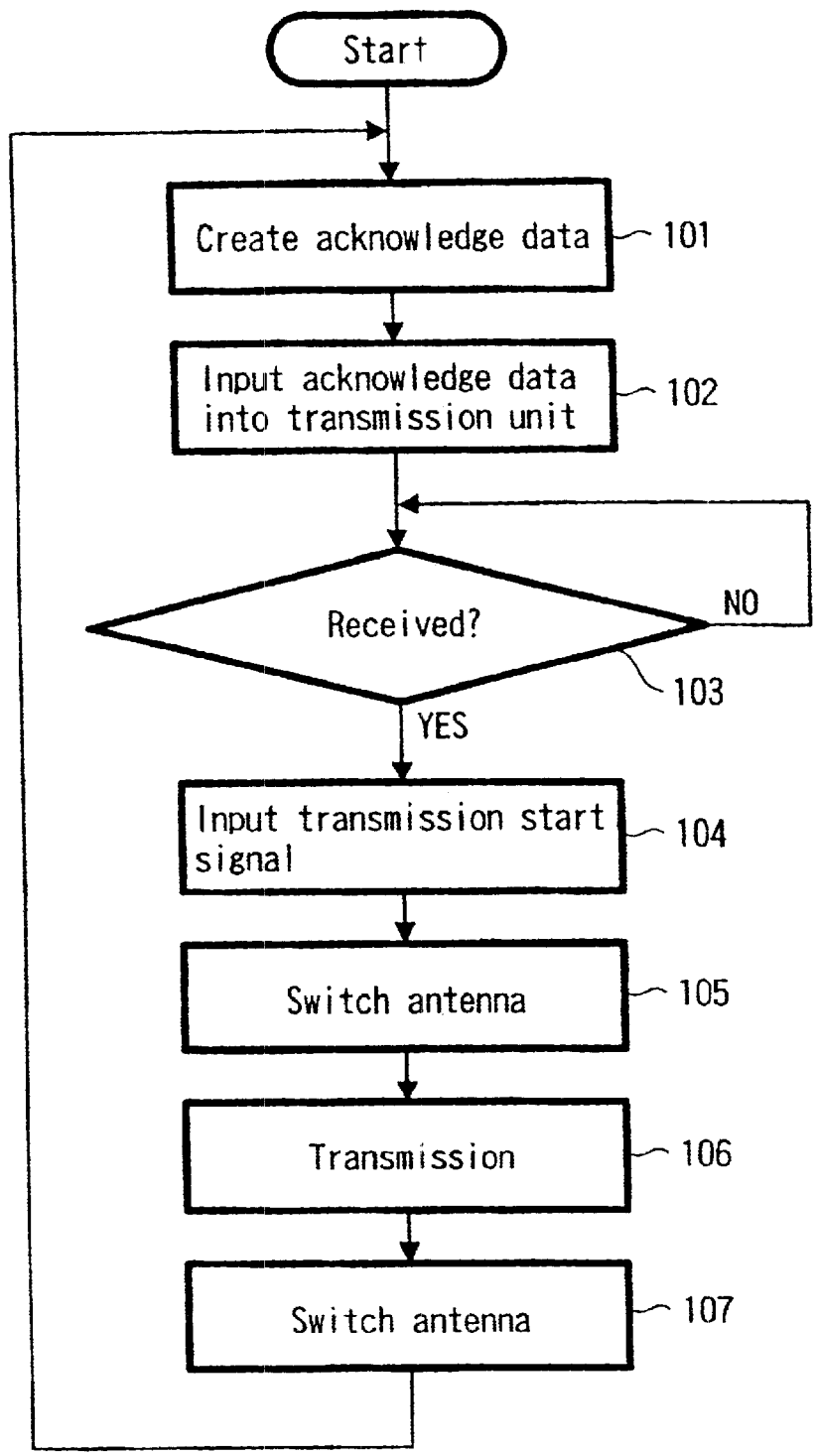
FIG. 6 is a flowchart to which reference will be made in explaining an operation of the transmission apparatus according to the first embodiment.

Referring to FIG. 6, following the start of operation, at a step 101, the link layer processing unit 14 creates acknowledge data for acknowledging the polling from the control station. This acknowledge data may be previously stored in a memory within the link layer processing unit 14. Then, the created acknowledge data is supplied from the terminal 25 to the input register 21 serving as the transmission-system circuit, and the transform processing start signal is supplied from the terminal 16 to the IFFT circuit 22 and thereby the IFFT circuit 22 starts the IFFT processing. The data thus inverse-fast-Fourier-transformed is set and accumulated in the output register 23 connected to the output unit of the IFFT circuit 22 at a step 102.

Under this state, it is determined at the next decision step 103 by the link layer processing unit 14 whether or not the reception circuit 13 receives the polling control signal for designating its own station. Then, the radio transmission apparatus is placed in the standby state until the corresponding polling control signal is received. If it is determined by the link layer processing unit 14 that the reception unit 13 received the corresponding polling control signal, then control goes to a step 104, whereat the transmission start signal is immediately supplied from the terminal 17 to the P/S converter 24. At the same time, control goes to a step 105, whereat the antenna change-over switch 12 is switched to the transmission side, and the P/S converter 24 starts to convert parallel data into serial data. Then, control goes to a step 206, in which the serial data thus converted is processed by the D/A converter 25, the modulation circuit 26 and the radio frequency-system circuit 27 and thereby transmitted from the antenna 11 via radio waves. Then, if there is a transmission signal after the acknowledge signal, the such signal is transmitted. Then, after such transmission processing is ended, control goes to a step 107, whereat the antenna change-over switch 12 is switched to the reception side. Then, control goes back to the step 101.

The transmission processing will be described more in detail with reference to a flowchart of FIG. 7.

Figure 7:
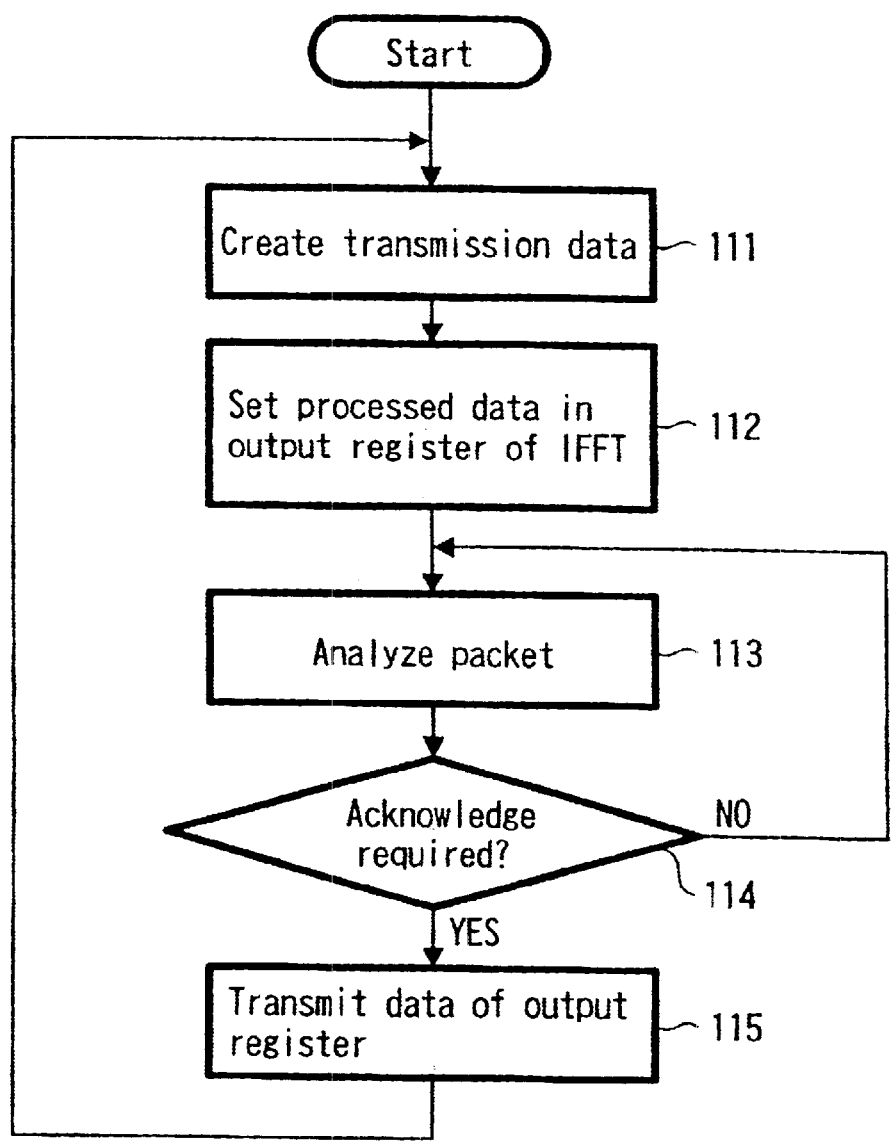
FIG. 7 is a flowchart to which reference will be made in explaining more in detail an operation of the transmission apparatus according to the first embodiment.

Referring to FIG. 7, following the start of operation, initially, there is created acknowledge signal data at a step 111. The, control goes to a step 112, whereat the acknowledge signal transmission data is supplied from the terminal 15 to the input register 21 serving as a transmission-system circuit. Also, a transform processing start signal is supplied from the terminal 16 to the IFFT circuit 22 so that the IFFT circuit 22 starts the transform processing. Then, the data thus inverse-fast-Fourier-transformed is set and accumulated in the output register 23 connected to the output section of the IFFT circuit 22. Then, control goes to a step 113, whereat the link layer processing unit 14 analyzes a reception packet. Control goes to the next decision step 114, whereat it is determined by the link layer processing unit 14 whether or not the contents of the analyzed packet should be acknowledged. If it is determined at the decision step 114 by the link layer processing unit 14 that the analyzed packet need not be acknowledged, then control goes back to the step 113.

If the analyzed packet should be acknowledged as represented by a YES at the decision step 114, then control goes to a step 115, whereat the transmission start signal is supplied from the terminal 17 to the P/S converter 24, in which the data set in the output register 23 is converted into the serial data. Then, the serial data thus converted is processed for transmission by the D/A converter 25, the modulation circuit 26 and the radio frequency-system circuit 27 and thereby transmitted from the antenna 11 via radio waves.

The transmission processing executed as described above is executed at the timing shown in FIG. 8. Specifically, there is a data input period $T_{11}$ in which data are set in the IFFT circuit 22 from the link layer processing unit 14 through the input register 21. The data thus inputted during this period $T_{11}$ is immediately inverse-fast-Fourier-transformed during the next inverse-fast-Fourier-transform period $T_{12}$. The parallel data thus transformed is set in the output register 23, and under this condition, the transmission apparatus is placed in the standby mode (period $T_{13}$).

Concurrently with the processing described so far, the reception packet reception processing $T_1$ is executed, and the reception period is followed by a period $T_2$ during which the reception packet is analyzed. If the analyzed packet is control data instructing the polling to its own station, then at the same time the analysis of the reception packet is analyzed, a transmission start signal S is outputted from the terminal 17, and the processing enters into a period $T_3$ in which the transmission packet transmission processing (transmission processing) is executed.

Accordingly, in the case of this embodiment, a processing delay $T_0$ from the reception of the polling instruction data to the transmission of the acknowledge data requires only a time of the period $T_2$ which is necessary for analyzing the received packet, and hence the acknowledge data can be rapidly transmitted to the polling.

Therefore, in the transmission channel (transmission band) for transmitting and receiving data by the polling, a time period in which no signal is transmitted can be reduced and hence the long data transmission time can be maintained, thereby making it possible to increase a data transmission efficiency at the prepared channel.

While the acknowledge signal which acknowledges the polling is transmitted as described above, the present invention may also be applied to a transmission processing other than the acknowledge signal transmission processing. That is, when it is necessary to constantly transmit the same signal during the first predetermined period, for example, if the same transmission signal is inverse-fast-Fourier-transformed by the inverse-fast-Fourier-transform circuit and the transmission of the prepared signal is started at a transmission timing, then there can be executed an efficient transmission processing.

Figure 9:
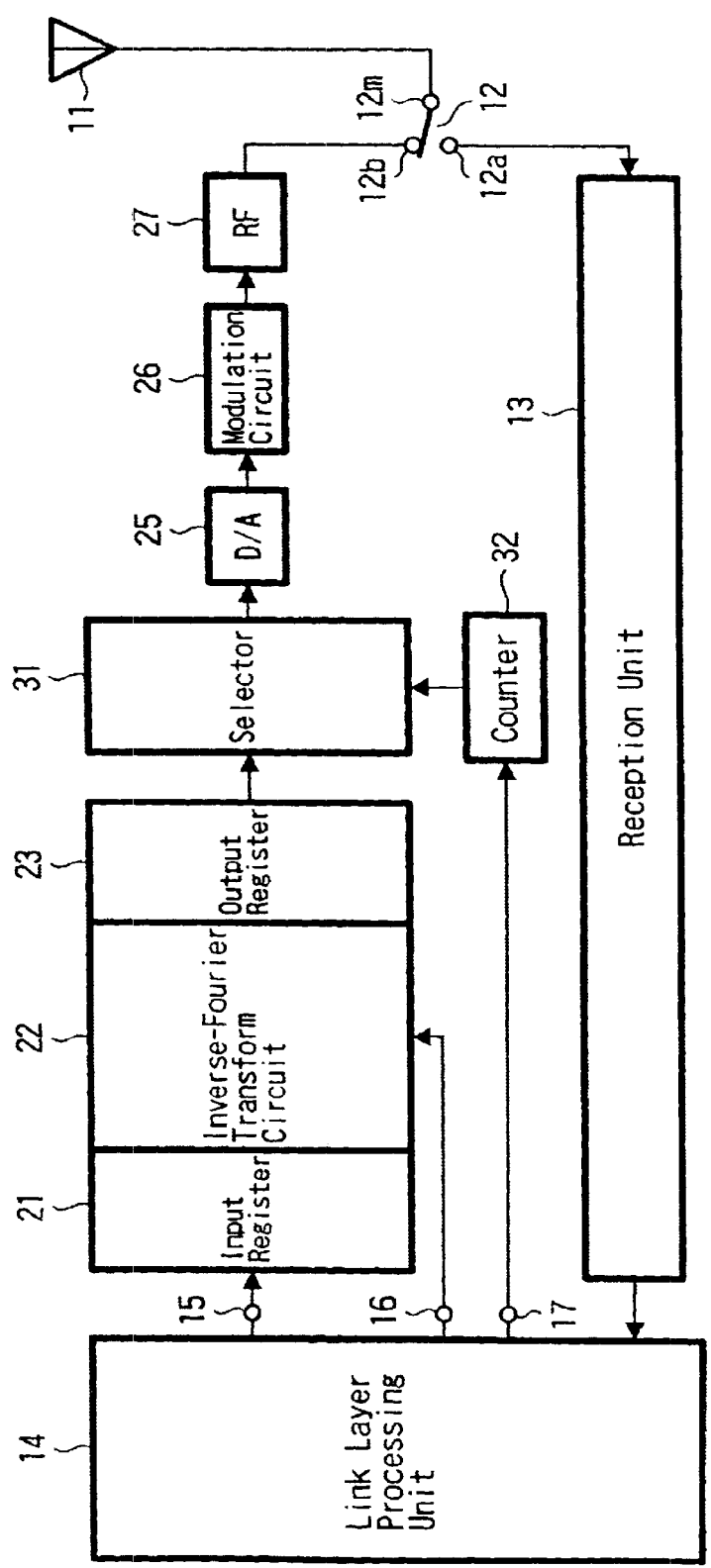
FIG. 9 is a block diagram showing a transmission apparatus according to a second embodiment of the present invention.

A second embodiment according to the present invention will be described next with reference to FIG. 9. In FIG. 9, elements and part identical to those of FIG. 5 are marked with the same references and therefore need not be described in detail.

Also in this embodiment, similarly to the above-mentioned first embodiment, the present invention is applied to the radio transmission apparatus which transmits and receives the OFDM-modulated signal. This radio transmission apparatus transmits data under control of polling from a radio transmission apparatus set as other control station within the network system.

The arrangement of the transmission system according to this embodiment will be described. Transmission data (or transmission data supplied from the processing apparatus connected to the link layer processing unit 14) generated from the link layer processing unit 14 is supplied from the terminal 15 to the input register 21 connected to the inverse fast Fourier transform (IFFT) circuit 22, and thereby set in this input register 21. Here, the IFFT circuit 22 is a circuit in which an orthogonal transform processing is effected to transform the time axis into the frequency axis by computation processing based on the inverse fast Fourier transform. Here, if an IFFT circuit which executes a transform processing of N points (N is an arbitrary integer: e.g. 64), then the input register 21 is comprised of a register of N stages (64 stages) connected in parallel. Thus, data supplied to the terminal 15 is simultaneously set in the register of 64 stages, and data are simultaneously inputted from the register of 64 stages to the IFFT circuit 22. The input of data to the IFFT circuit 22 and the start of the inverse fast Fourier transform processing are instructed by the start signal supplied to the IFFT circuit 22 from the link layer processing unit 14 through the terminal 16.

Since the transform processing of N points (64 points) is executed by the IFFT circuit 22, the data thus transformed becomes parallel data of N series (64 series), and the parallel data of 64 series is set in the output register 23. The parallel data of 64 series set in the output register 23 is supplied to a selector 31. The selector 31 is the circuit in which an address of a series selected as data output by the count output from the counter 32 is designated. Data selected by the selector 31 is supplied to the D/A converter 25.

The counter 32 is the counter which is adapted to count data in a predetermined order. The counter 32 uses a count value of 60 as its initial value, for example, and counts data from its initial value in the descending order, and sequentially designates the addresses of 64 series. Here, let it be assumed that $y_0$ to $y_{63}$ are parallel data of 64 series, for example. Then, in this embodiment, the same address is repeatedly designated with respect to the starting four series of $y_{60}$ to $y_{63}$ and the ending four series of $y_0$ to $y_3$ and the same data is outputted repeatedly, whereby the starting 8 samples and the ending 8 samples form data of repetitive waveform. As a result, with respect to the data outputted from the selector 31, data of 72 points comprise the OFDM-modulated signal of one unit.

Figure 8:
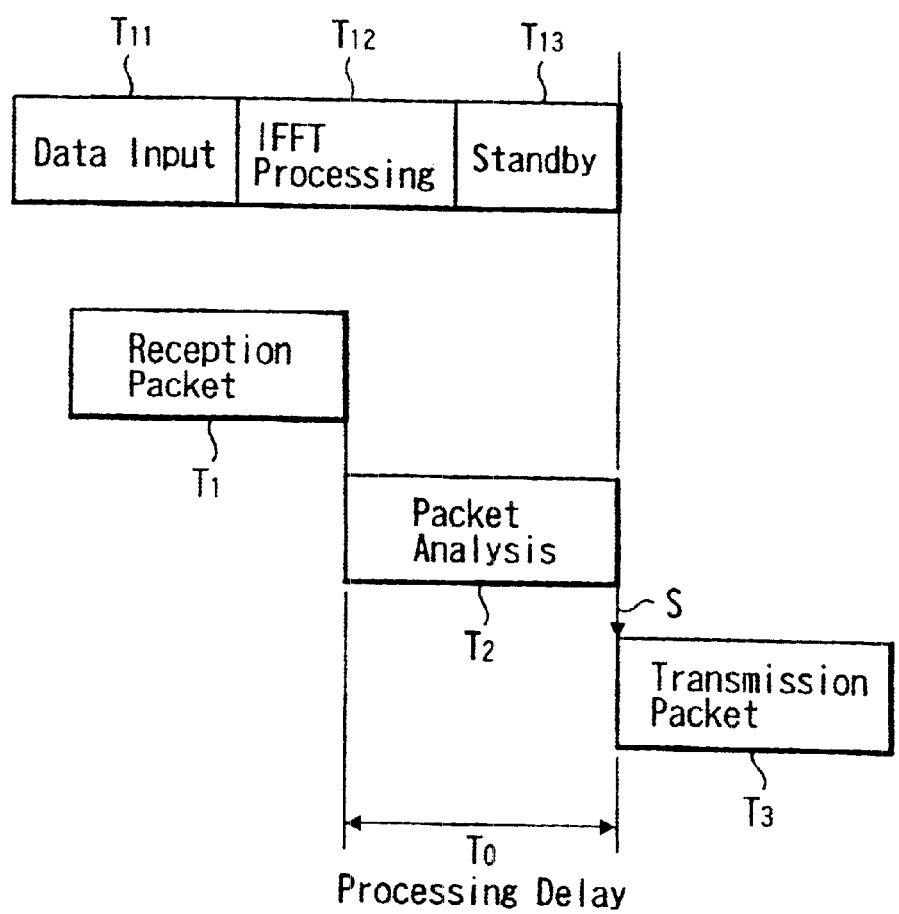
FIG. 8 is a timing chart showing a series of operation from the reception to the transmission according to the first embodiment of the present invention.

A rest of the arrangement is similar to that of the radio transmission apparatus described in the first embodiment, and the processing state and the timing used upon transmission are the same as those of the first embodiment which has been described so far with reference to FIGS. 6 to 8. Specifically, in the transmission processing in the transmission circuit according to this embodiment, when the polling control signal for designating its own station is received by the reception unit 13, the acknowledge signal which acknowledges the polling control signal is transmitted and the transmission data supplied from the processing apparatus (not shown) or the like is transmitted. In this embodiment, the acknowledge signal itself is created under control of the link layer processing unit 14 before the link layer processing unit 14 judges whether or not it should acknowledge the polling control signal. Then, the acknowledge signal data thus created is set in the input register 21 from the terminal 15 and the transform processing start signal is supplied from the terminal 16 to the IFFT circuit 22 so that the IFFT circuit 22 executes the inverse fast Fourier transform processing. Then, the transmission apparatus is placed in the standby mode under the condition that the data which results from inverse-fast-Fourier-transforming the data is set in and accumulated in the output register 23. Then, if the link layer processing unit 14 determines that it should acknowledge the polling, then the transmission start signal is supplied to the counter 32 from this link layer processing unit 14 through the terminal 17 to enable the counter 32 to start the counting, and the selector 31 starts to output the serial data in the sequential order based on the count value of the counter 32.

Also in the case of this second embodiment, similarly to the case of the above-mentioned first embodiment, since the processing delay from the reception of the polling instructing data to the transmission of the acknowledge data becomes the time of the period required by analyzing the received packet, and hence the acknowledge data to the polling can be transmitted rapidly. Accordingly, in the transmission channel in which data is transmitted and received under control of the polling, the time in which no signal is transmitted can be reduced, and the long data transmission time can be maintained, thereby making it possible to increase the data transmission efficiency in the prepared channel.

Then, in the case of the second embodiment, since the output of the IFFT circuit 22 is converted into the parallel data by the combination of the selector 31 and the counter 32, serial data can be satisfactorily outputted on the basis of the output from the counter serving as the order data generating means for generating order data which determines the output order of serial data. Particularly, in the case of this embodiment, since the selection of the same series is repeated in the starting portion and the ending portion of the OFDM-modulated signal of one unit, the guard interval based on the repetitive waveform in which the same signal is repeated is formed in the transmission signal so that the OFDM-modulated signal with the guard interval can be transmitted by a simple processing.

Incidentally, also in the case of the second embodiment, it is needless to say that the present invention may be applied to the transmission processing other than the transmission processing of the acknowledge signal which responds to the polling. Also, while the range in which the guard interval is given to the data as described above in the second embodiment has been described so far by way of example, the present invention is not limited thereto, and other data format may be used.

According to the transmission method claimed in claim 1, at the transmission timing, the previously-prepared and accumulated data is immediately converted into serial data and then transmitted. Therefore, it is possible to reduce the processing time from the transmission timing point to the actual data transmission.

According to the transmission method claimed in claim 1, in the invention claimed in claim 1, since the transmission data is the data which responds to the polling identified from the received data, if the present invention is applied to the transmission processing in which the predetermined acknowledge data should be transmitted when the transmission is started, then it is possible to effectively reduce the time necessary for such response.

According to the transmission method claimed in claim 1, in the invention claimed in claim 1, when parallel data is converted into serial data, the accumulated data are sequentially outputted in the sequential order based on the predetermined output order data and thereby converted into serial data, whereby the processing for giving the guard interval to data also can be carried out simultaneously. Therefore, it is possible to further reduce a time necessary for the transmission processing.

According to the transmission apparatus claimed in claim 4, since at the transmission timing point the output of the register in which the output data of the inverse fast Fourier transform means is set is converted into serial data by the serial converting means and then transmitted, as compared with the case in which the whole processing is started after the previously-prepared transmission data is inverse-fast-Fourier-transformed and accumulated and the transmission timing is determined, the processing time required until the data is set to the inverse-fast Fourier transform means can be reduced, and hence the processing time required until data is transmitted in actual practice can be reduced.

According to the transmission apparatus claimed in claim 5, in the invention claimed in claim 1, since the control means controls the serial converting means such that the serial converting means starts converting data when the polling data is identified from the received data, there can be obtained the transmission apparatus in which the time necessary for responding to the polling can be reduced.

According to the transmission apparatus claimed in claim 1, in the invention claimed in claim 4, since the selection means for sequentially outputting data in the order designated by the predetermined output order data is used as the serial converting means, the processing for adding the guard interval to the data upon transmission can be executed simultaneously, and hence the time necessary for the transmission processing can be reduced much more.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A transmission method, comprising the steps of:
    inverse-Fourier-transforming transmission data at N points and accumulating said inverse-Fourier-transformed data as N series data in an output register, wherein N is an arbitrary integer;
    placing a transmission apparatus in a standby mode; and
    converting said accumulated N series data into serial data, while said transmission apparatus is in said standby mode, and transmitting said converted serial data by a predetermined transmission processing at a transmission timing after ceasing said standby mode.

2. The transmission method as claimed in claim 1, wherein said transmission data are data that respond to a polling identified from received data.

3. The transmission method as claimed in claim 1, wherein when said accumulated data are converted into said serial data said accumulated data are sequentially outputted in an order based on predetermined output order data and are thereby converted into said serial data.

4. A transmission apparatus, comprising:
    inverse-Fourier-transforming means for inverse-Fourier-transforming predetermined transmission data at N points, wherein N is an arbitrary integer;

an output register for setting N series data transformed by said inverse-Fourier-transforming means;

serial converting means for converting said data set in said output register into serial data;

transmission processing means for transmitting said data converted by said serial converting means; and control means for controlling said serial converting means based on a judgment of a transmission timing such that said serial converting means starts converting said data set in said output register at a proper timing, wherein the transmission apparatus is placed in a standby mode when said transformed data are set in said output register.

5. The transmission apparatus as claimed in claim 4, wherein said control means controls said serial converting means such that said serial converting means starts said conversion when said control means identifies polling data from received data.

6. The transmission apparatus as claimed in claim 4, wherein said serial converting means includes selection means for outputting said data in a sequential order designated by predetermined output sequential order data.

* * * * *